United States Patent
Nymann et al.

(10) Patent No.: US 7,982,352 B2
(45) Date of Patent: Jul. 19, 2011

(54) ELECTRICAL MOTOR/GENERATOR HAVING A NUMBER OF STATOR POLE CORES BEING LARGER THAN A NUMBER OF ROTOR POLE SHOES

(75) Inventors: Ole Nymann, Allerod (DK); Kim Dam Larsen, Nykobing Sj. (DK); Uffe Dam, Ringsted (DK)

(73) Assignee: Vestas Wind Systems A/S (DK)

( * ) Notice: Subject to any disclaimer, the term of this patent is extended or adjusted under 35 U.S.C. 154(b) by 1233 days.

(21) Appl. No.: 10/528,131

(22) PCT Filed: Sep. 18, 2003

(86) PCT No.: PCT/DK03/00604
§ 371 (c)(1),
(2), (4) Date: Jan. 3, 2007

(87) PCT Pub. No.: WO2004/027961
PCT Pub. Date: Apr. 1, 2004

(65) Prior Publication Data
US 2008/0203848 A1 Aug. 28, 2008

(30) Foreign Application Priority Data
Sep. 18, 2002 (DK) .................................. 2002 01373

(51) Int. Cl.
*H02K 21/12* (2006.01)
(52) U.S. Cl. ................................. 310/156.32; 310/114
(58) Field of Classification Search .......... 310/112–114, 310/162, 171, 184, 268, 156.32, 156.35, 310/156.55, 156
See application file for complete search history.

(56) References Cited

U.S. PATENT DOCUMENTS

| | | | | |
|---|---|---|---|---|
| 4,363,988 | A * | 12/1982 | Kliman | 310/268 |
| 4,996,457 | A * | 2/1991 | Hawsey et al. | 310/268 |
| 5,642,009 | A * | 6/1997 | McCleer et al. | 310/156.35 |
| 5,982,070 | A * | 11/1999 | Caamano | 310/216.047 |
| 6,373,162 | B1 * | 4/2002 | Liang et al. | 310/156.53 |
| 6,844,656 | B1 * | 1/2005 | Larsen et al. | 310/268 |

FOREIGN PATENT DOCUMENTS

| | | |
|---|---|---|
| JP | 4-164 | 1/1992 |
| JP | 5137304 | 6/1993 |
| JP | 5161325 | 6/1993 |
| JP | 9182329 A | 7/1997 |
| JP | 10271784 A | 10/1998 |
| WO | WO 96 29774 | 9/1996 |
| WO | WO 00 48297 | 8/2000 |
| WO | WO 01 06623 | 1/2001 |

OTHER PUBLICATIONS

International Search Report; PCT/DK03/00604; Jan. 28, 2004.
Muljadi E et al; "Axial-Flux Modular Permanent-Magnet Generator With a Toroidal Winding for Wind-Turbine Applications"; IEEE Transactions on Industry Applications; IEEE Inc. New York, US, vol. 35 No. 4; Jul. 1999, pp. 831-835; XP000920382; ISSN: 0093-9994 (whole document).

* cited by examiner

*Primary Examiner* — Thanh Lam
(74) *Attorney, Agent, or Firm* — St. Onge Steward Johnston & Reens LLC (57) ABSTRACT

An axial magnetic flux electrical machine having a rotor attached to a shaft, the rotor comprising magnets and pole shoes; and a stator, the stator has a separate pole cores having corresponding separate coils, and the number of poles cores is larger than the number of pole shoes.

55 Claims, 7 Drawing Sheets

ELECTRICAL MOTOR/GENERATOR HAVING A NUMBER OF STATOR POLE CORES BEING LARGER THAN A NUMBER OF ROTOR POLE SHOES

FIELD OF INVENTION

This present invention relates to an electrical machine being a motor or generator, and more particularly to a synchronous machine having a number of stator pole cores being larger than the number of rotor pole shoes. The present invention further relates to an electrical machine with axial magnetic flux. The electrical machine can operate either as a motor or generator, and will just be called generator in the following.

BACKGROUND OF THE INVENTION

Electrical generators may be used in many different fields. When a generator is e.g. used in a wind turbine, one of the more important economic parameters, with respect to the dimensioning of the wind turbine, is the size of the housing. It is therefore of great importance to be able to minimize the diameter of the wind turbine. In order to minimize the housing one has to minimize the gearbox/gear wheel connecting the wing and the generator. This can be achieved by providing a generator which has a relatively large effect per revolution.

One way to achieve this is to have a generator with as small a radial extent as possible, since the generator occupies a relative large amount of space in the housing of the wind turbine.

Another aspect to be considered when implementing generators in wind turbines is that the generator has to be effective both at a low and a high number of revolutions.

Figure 1:
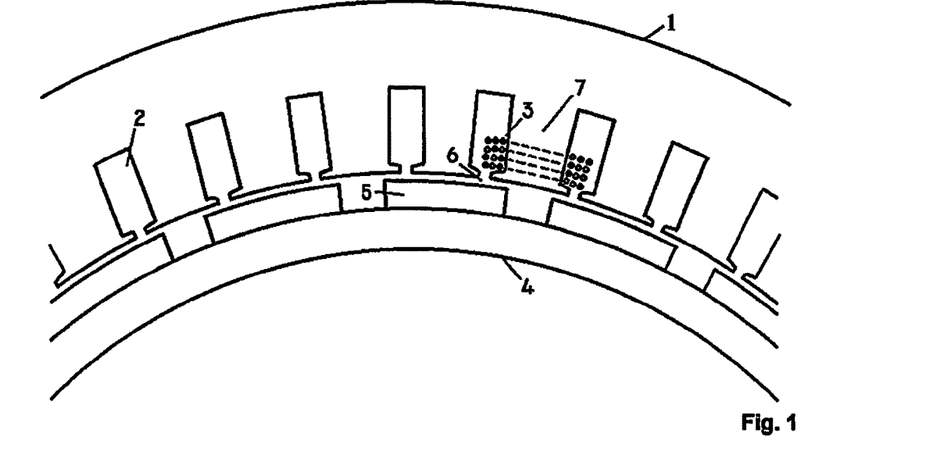
FIG. 1 shows a sectional view of a part of a prior art generator having a radial magnetic flux.

An electrical machine based on a conventional radial flux generator, see FIG. 1, is most frequently used. A main problem with generators of this kind in certain situations is that the diameter for a given power output is relatively large, because of the radially built stator construction. A further disadvantage is that the stator surrounds/encircles the rotor, thereby adding to the diameter of the generator.

Another disadvantage is the relative low induction in the air gap caused by the individual arrangement of the material between the recess 7 and the recess 2 themselves, since only the material 7 carries the flux and only covers about 50% of the free space toward the gap.

There are many generators of similar kind, which are optimized in one way or another, but they all have a radial flux and thus involve the same problem, i.e. a relatively larger diameter, like the one described above.

Figure 2:
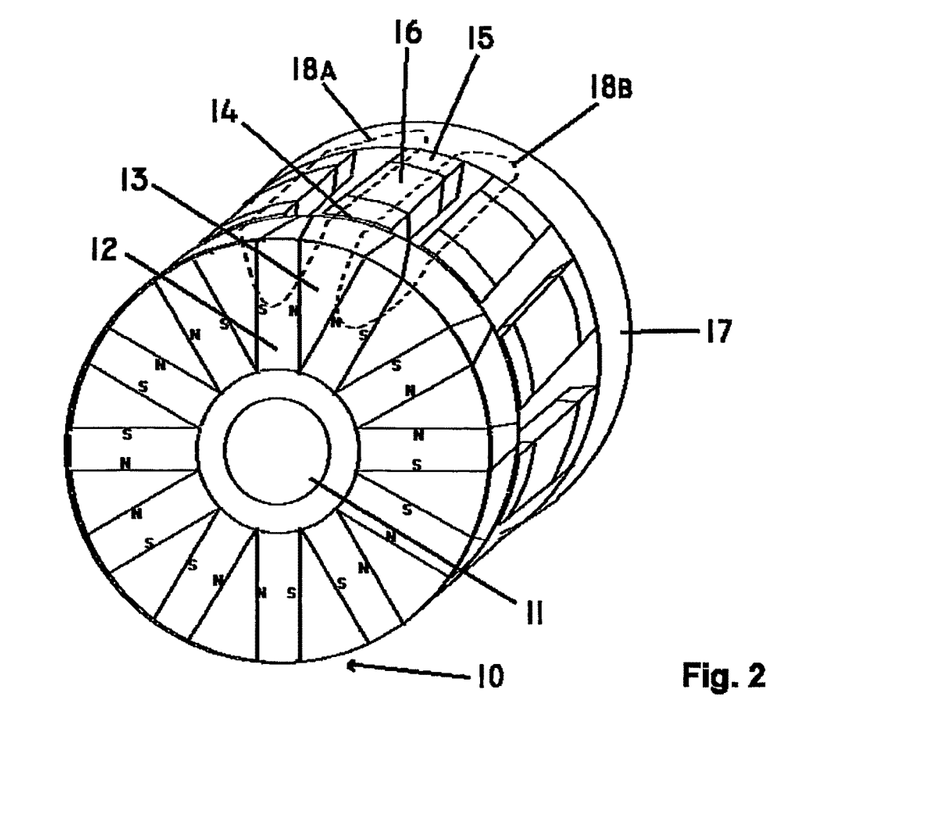
FIG. 2 shows a schematic view of a prior art generator having an axial magnetic flux and having one rotor and one stator.

A motor or generator having an axial flux, see FIG. 2, is proposed in WO 00/48247, which is hereby included by reference. Here, a motor or generator is provided having a magnetic flux path through one or more pole cores 15 surrounded by current windings 16 and extending in the axial direction. This allows a high density of the magnetic flux to be passed through the pole cores 15, resulting in a low consumption of material for the pole cores when compared to machines, where for example a large stator diameter may be needed in order to conduct a high magnetic flux. By having the pole cores 15 arranged parallel to the axis of the rotor 10, the overall diameter of the motor or generator may be reduced, thus providing a solution to some of the above-mentioned problems.

For the motor or generator described in WO 00/48247 the number of pole cores or pole legs 15 arranged in the stator equals the number of magnets arranged in the rotor, and according to the embodiment illustrated in FIG. 2, the motor or generator comprises one rotor 10 and one stator. The rotor 10 has a number of pole shoes 13, disposed between magnets 12. The stator comprises a number of pole cores or pole legs 15, where the number of pole legs 15 equals the number of magnets 12, which again equals the number of pole shoes 13. There are two adjacent local magnetic circuits for each given pole core 15. Two of these are schematically illustrated by the first and second loops 18a, 18b. It is seen that when the pole shoes 13 are facing the pole legs 15, a magnetic flux path 18a includes a first pole leg, a first pole shoe, a magnet, a second pole shoe, and a second pole leg.

Figure 3:
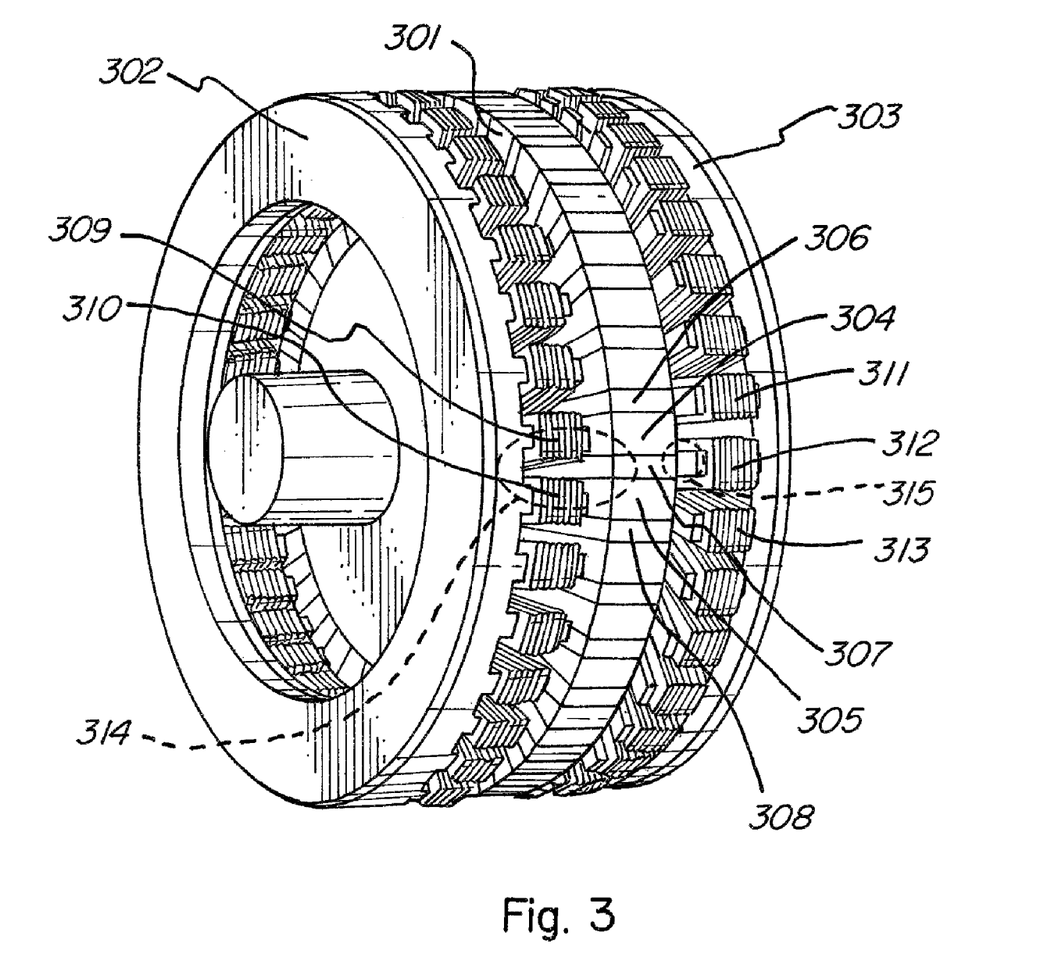
FIG. 3 shows a perspective view of a prior art generator having an axial magnetic flux and having one rotor and two stators.

In FIG. 2, the density of the magnetic flux in the flux path 18a or 18b is relatively high, leading to a high resulting axial magnetic force between the rotor 10 and pole legs 15 of the stator. When the stator 10 is rotated so that each magnet 12 is now facing a pole leg 15, a third magnetic flux path will include only one pole leg 15, a first pole shoe, a magnet, and a second pole shoe (this situation is illustrated in FIG. 3). The magnetic flux density of the third flux path is lower than for the first and the second flux paths 18a, 18b, leading to a lower resulting axial magnetic force between the rotor 10 and the pole legs 15, when compared to the rotor position illustrated in FIG. 2. So, when the rotor 10 is rotated during use, the resulting axial force between the rotor 10 and the pole legs 15 of the stator will vary between a relatively high and a relatively low force. Such a high, varying axial force may result in several drawbacks including a high wear on the rotor 10 and its axial connection.

According to another embodiment of the motor or generator described in WO 00/48247 having an axial flux and illustrated in FIG. 3, the motor or generator comprises one rotor 301 and two stators 302, 303 arranged on opposite sides of the rotor 301. The rotor 301 has pole shoes 304, 305 and a magnet 306, 307, 308 between each two succeeding pole shoes. The pole shoes 304, 305 are crossing the rotor 301, whereby pole shoes are provided on each side of the rotor 301. The first stator 302 has pole cores or pole legs 309, 310 facing the poles shoes 304, 304 of the rotor 301, while the second stator 303 has pole cores or pole legs 311, 312, 313 facing the magnets 306, 307, 308 of the rotor 301. Here, the pole legs 309, 310 of the first stator 302 is displaced compared to the position of the pole legs 311, 312, 313 of the second stator 303.

For the generator of FIG. 3, a first magnetic flux path 314 of the rotor 301 and the first stator 302 includes the pole legs 310, 309, the pole shoe 304, the magnet 307, and the pole shoe 305. However, a second magnetic flux path 315 exists corresponding to the flux path 314. This second magnetic flux path 315 includes only one pole leg 312, the pole shoe 304, the magnet 307, and the pole shoe 305. It should be understood that as the number of pole legs in the stators 302, 303 equals the number of magnets in the rotor 301, similar corresponding magnetic flux paths exist for the remaining stator pole legs and rotor pole shoes and magnets.

Here, the density of the magnetic flux in flux path 314 is much higher than the density of the magnetic flux in flux path 315. Thus, the resulting axial magnetic force between the rotor 301 and the first stator 302 is much higher than the resulting and oppositely directed axial magnetic force between the rotor 301 and the second stator 303. However, when the rotor 301 is rotated so that the pole shoes 304, 305 are now facing pole legs 312, 313, respectively of the second stator 302, while the magnet 307 is facing pole leg 310, the magnitudes of the oppositely directed axial magnetic forces between the rotor 301 and the two stators 302, 303 changes, so that the force between the rotor 301 and first stator 302 is lower than the force between the rotor 301 and the second stator 302.

So, when the rotor 301 is rotating during use, the maximum axial force on the rotor 301 is high, but changes in direction during the rotation. Such a high, varying axial force may result in several drawbacks including a high wear on the rotor 301 and its axial connection.

Thus, there is a need for a design of a motor or generator having an axial flux, but having only a relatively small variation in the varying axial force on the rotor to thereby reduce the wear of the rotating parts.

SUMMARY OF THE INVENTION

According to a first aspect of the present invention there is provided an electrical machine comprising: a rotor secured to a shaft with an axis of rotation, said rotor comprising magnets or means for producing a magnetic field and a number set to N of pole shoes, a first stator with air gaps formed between the rotor and the first stator, said first stator comprising a number set to M of separate pole cores or pole legs having corresponding separate coils or set of windings wound on and surrounding said pole cores or pole legs, wherein N and M are larger than one and M is larger than N.

It is preferred that the rotor magnets or means for producing a magnetic field are arranged between the pole shoes. According to a preferred embodiment of the present invention, the rotor magnets or means for producing a magnetic field alternate with the pole shoes. Thus, the number N of rotor pole shoes may be equal to the number of magnets or means for producing a magnetic field arranged in the rotor.

It is preferred that N is an equal number. It is also preferred that M is given by A times N, M=AN, where A is an integral number larger than 1. Thus, it is preferred that M may be equal to 2N, or M may be equal to 3N, or M may be equal to 4N.

However, the present invention also covers embodiments where M differs from A times N. Here, according to an embodiment of the invention, M may be given by N plus 2 times C, M=N+2C, where C is an integral number larger than or equal to 1.

According to a preferred embodiment of the present invention, the machine of the invention may further comprise a second stator with air gaps formed between the rotor and the second stator, said second stator comprising a number set to P of separate pole cores having corresponding separate coils or set of windings wound on and surrounding said pole cores, wherein P is larger than one.

According to an embodiment of the invention, P may be smaller than or equal to N. However, it is preferred that P is larger than N, and P may be given by B times N, where B is an integral number larger than 1. Thus, it is preferred that P may be equal to 2N, or P may be equal to 3N, or P may be equal to 4N. It is also within a preferred embodiment that P is equal to M.

Also here, the present invention covers embodiments where P differs from B times N, and according to an embodiment of the invention, P may be given by N plus 2 times D, P=N+2D, where D is an integral number larger than or equal to 1.

It is within a preferred embodiment of the invention that each separate pole core has a corresponding separate coil or set of windings. It is also within a preferred embodiment that the rotor is arranged so that at least part of the rotor is substantially perpendicular to the axis of rotation According to embodiments of the present invention, the pole cores or pole legs may have different orientation in relation to the axis of rotation. However, in a preferred embodiment, at least a portion of one or more of the pole cores or pole legs of the first and/or second stator is arranged at an angle to the axis of rotation, said angle being equal to or greater than 0 degrees and below 90 degrees. Here, the angle between the poles cores or pole legs and the axis of rotation may be equal to or below 45 degrees, such as equal to or below 30 degrees. Preferably, at least a portion of one or more of the pole cores or pole legs may be substantially parallel to the axis of rotation, and it is also within a preferred embodiment that at least a portion of all of the pole cores or pole legs is substantially parallel to the axis of rotation. When at least a portion of one or more of the pole cores or pole legs are substantially parallel to the axis of rotation, then one or more windings or coils may also have their axis substantially parallel to the axis of rotation.

For the electrical machine of the invention, the first stator may preferably be arranged opposite to and facing a first side of the rotor. For the embodiments of the invention having two stators, it is preferred that the second stator is arranged opposite to and facing a second side of the rotor.

When arranging the magnets or means for producing magnetic fields and the pole cores or pole legs, it is preferred that they are arranged so that the pole cores of a stator provide part(s) of one or more magnetic flux paths. Here, a magnetic flux path may include flux paths through two pole cores, and the magnetic flux path may further include two air gaps. Preferably, a magnetic flux path includes two and only two pole cores, and the magnetic flux path may further include two and only two air gaps.

For the machine of the present invention it is preferred that the rotor is substantially circular. It is also preferred that the first and/or second stator further comprises a magnetic conductive end plate connected to the pole cores, where the end plate(s) may be arranged substantially parallel and opposite to the rotor.

It is preferred that the magnets or means for producing a magnetic field are arranged in pairs having poles of similar polarity facing each other. When arranging the magnets or means for producing a magnetic field, different arrangement may be used. Thus, the magnets or means for producing a magnetic field may be located radially and equidistantly in the rotor. They may also be located on the first side of the rotor facing ends of the pole cores of the first stator. For embodiments having two stators, magnets or means for producing a magnetic field may be located on the second side of the rotor facing ends of the pole cores of the second stator. However, it is preferred that the magnets or means for producing a magnetic field are located on the outer periphery of the rotor.

Different outer measures may be used for the pole cores or pole legs arranged in a stator. However, according to an embodiment of the invention it is preferred that the width of a pole core or pole leg is substantially equal to the distance between two successive pole cores or pole legs. It is also preferred that the width of a pole shoe is substantially equal to two times the distance between two successive pole cores or pole legs of the first and/or second stator.

It should be understood that according to the present invention, the magnets or means for producing a magnetic field may be permanent magnets or electromagnets.

When producing or forming the windings or coils of the machine of the invention, it is preferred to use a flat concentrated coil. When producing the pole cores, it is preferred that these are made of or assembled of a magnetic conducting material, which magnetic conducting material may be a field oriented soft magnetic lamination.

The machine according to the embodiments of the present invention may preferably be formed as a synchronous one phase machine. The machine may have the form of a generator, which may be provided with a mechanical force/power via the shaft to generate an electrical power via the windings, or the machine may have the form of a motor, which may be provided with power from an electrical source via the windings to generate a mechanical force/power via the shaft.

It should be understood that a generator according to an embodiment of the present invention may be well suited to be used in a wind turbine.

A further object of the present invention is to provide a machine or generator/motor, which may provide a multiple phase output without enlarging the diameter of the generator. The multiple number of phases may be achieved by arranging a corresponding number of one phase machines according to any one of the above mentioned embodiments in series.

According to a preferred embodiment of the present invention, the pole legs or pole cores may be formed by substantially U-shaped elements. Here, the U-shaped elements may be arranged in the stator so that one pole leg is formed by two adjacent legs of two U-shaped elements. It is preferred that the U-shaped pole legs or pole cores are made of a magnetic conducting material, and that the pole legs are arranged on a stator plate made of a material having a low magnetic conductivity.

BRIEF DESCRIPTION OF THE DRAWINGS

The invention will be explained more fully below in connection with some preferred embodiments and reference to the accompanying drawings, in which.

DETAILED DESCRIPTION OF THE INVENTION

FIG. 1 shows a sectional view of a part of a generator according to the prior art. The figure shows a stator 1 which has recesses 2 with coils 3 wound in the traditionally manner, i.e. from a given recess to another, depending on the phases of the current generated. Also shown is a rotor 4 with magnets 5 spaced apart from the boundary of the rotor 4. Between the magnets 5 on the rotor 4 and the stator 1 there is an air gap.

When the rotor 4 moves via a shaft (not shown) with respect to the stator 1, the magnets are moved past the coils 3 and current is thus induced in these.

If current is supplied to the coils 3, a magnetic field will make the rotor 4 and the shaft move, and the electrical machine functions as a motor.

The construction according to the prior art has the disadvantages already mentioned in the Background of the Invention.

FIG. 2 shows a schematic view of an embodiment of a prior art generator having an axial magnetic flux and described in WO 00/48247. The Figure shows a pole wheel 10 which functions as a rotor and is secured to a shaft 11. A plurality of magnets 12 is disposed radially in such a way that the magnets have poles of similar polarity (N) facing each other and poles of similar polarity (S) facing each other. The magnets 12 are preferably permanent magnets but could also be electromagnets or the like.

A plurality of pole shoes 13, preferably made of laminated sheet metal or massive iron, is disposed between the magnets 12, which concentrate the magnetic flux and have a relatively small remanence/residual magnetism, i.e. they are good magnetic conductors. The pole shoes 13 and the magnets 12 are magnetically isolated from the shaft 11.

The present invention provides a machine or generator/motor, which may provide a multiple phase output without enlarging the diameter of the generator. The multiple number of phases may be achieved by arranging a corresponding number of one phase machines according to any one of the above mentioned embodiments in series.

There are two adjacent local magnetic circuits for each given pole core 15. Two of these are schematically illustrated by the loops 18a, 18b, and have already been discussed in the Background of the Invention.

Electrical windings 16, e.g. coils, preferably surround each of the pole legs 15. Preferably, the coils 16 are tightly and closely wound around the pole legs 15. This arrangement is very efficient with respect to induction in the windings/coils 16, since the flux is highly concentrated/uniform in the pole cores 15 in this arrangement. The windings 16 are preferably formed by flat concentrated coil, which has a high fill factor. By having the windings 16 concentrated on the pole cores 15 almost all of the coil material is affected, as opposed to the generator shown in FIG. 1, since the flux flow affects almost all of the coil material (except of course the material conducting the current away from the generator).

When the rotor 10 is moved with respect to the stator 15, 17, the magnetic flux in a given pole core 15 changes direction, since the polarity at the air gap 14 changes (from N to S or vice versa), and current is thereby induced in the windings 16. This induction is very efficient, as mentioned, since the magnetic flux is highly concentrated/uniform in the area surrounded by windings 16, i.e. in the pole core 15.

For stand-alone generators the shaft 11 is preferably rotatably mounted in a bearing or the like (not shown) in the plate 17 to support the shaft 11 additionally and stabilize the rotation of the rotor 10 with respect to the stator 15, 17. For generators used in wind turbines, the rotor 10 is preferably secured on the shaft of the wind turbines and the stator 15, 17 is preferably secured to a bearing holding the shaft of the wind turbines.

In FIG. 2 the magnets 12 are arranged radially, but as an alternative, they may be arranged on the side of the rotor 10 in such a way that the magnets have poles of similar polarity (N) facing each other and poles of similar polarity (S) facing each other, and in such a way that the magnets 12 are facing the pole legs 15. Also here, pole shoes 13 may be disposed between the magnets 12.

FIG. 3 shows a perspective view of a prior art motor/generator corresponding to another embodiment of a motor/ generator described in WO 00/48247 having an axial magnetic flux and having one rotor and two stators. The motor/generator comprises one rotor 301 and two stators 302, 303 arranged on opposite sides of the rotor 301. The rotor 301 has pole shoes 304, 305 and a magnet 306, 307, 308 between each two succeeding pole shoes. The pole shoes 304, 305 are crossing the rotor 301, whereby pole shoes are provided on each side of the rotor 301.

The first stator 302 has pole cores or pole legs 309, 310 facing the poles shoes 304, 305 of the rotor 301, while the second stator 303 has pole cores or pole legs 311, 312, 313 facing the magnets 306, 307, 308 of the rotor 301. Here, the pole legs 309, 310 of the first stator 302 is displaced compared to the position of the pole legs 311, 312, 313 of the second stator 303. The pole cores 309, 310 of the first stator 302 are secured to a first magnetic termination plate/end shield, while the pole cores 311, 312, 313 of the second stator 303 are secured to a second magnetic termination plate/end shield. Each of the termination plates is preferably a circular core using non field orientated laminated iron wrapped in a circular shape using one length of iron.

Similar to the pole legs 15 of FIG. 2, then for the pole legs 309, 310 of the first stator and 311, 312, 313 of the second stator, electrical windings (not shown), e.g. coils, surround each of the pole legs. Preferably, the coils are tightly and closely wound around the pole legs.

The magnetic flux paths 314, 315 of the motor/generator of FIG. 3 have already been discussed in the Background of the Invention.

It should be understood that the materials used for the motor/generator of FIG. 3 may correspond to the materials used for the motor/generator of FIG. 2.

Figure 4:
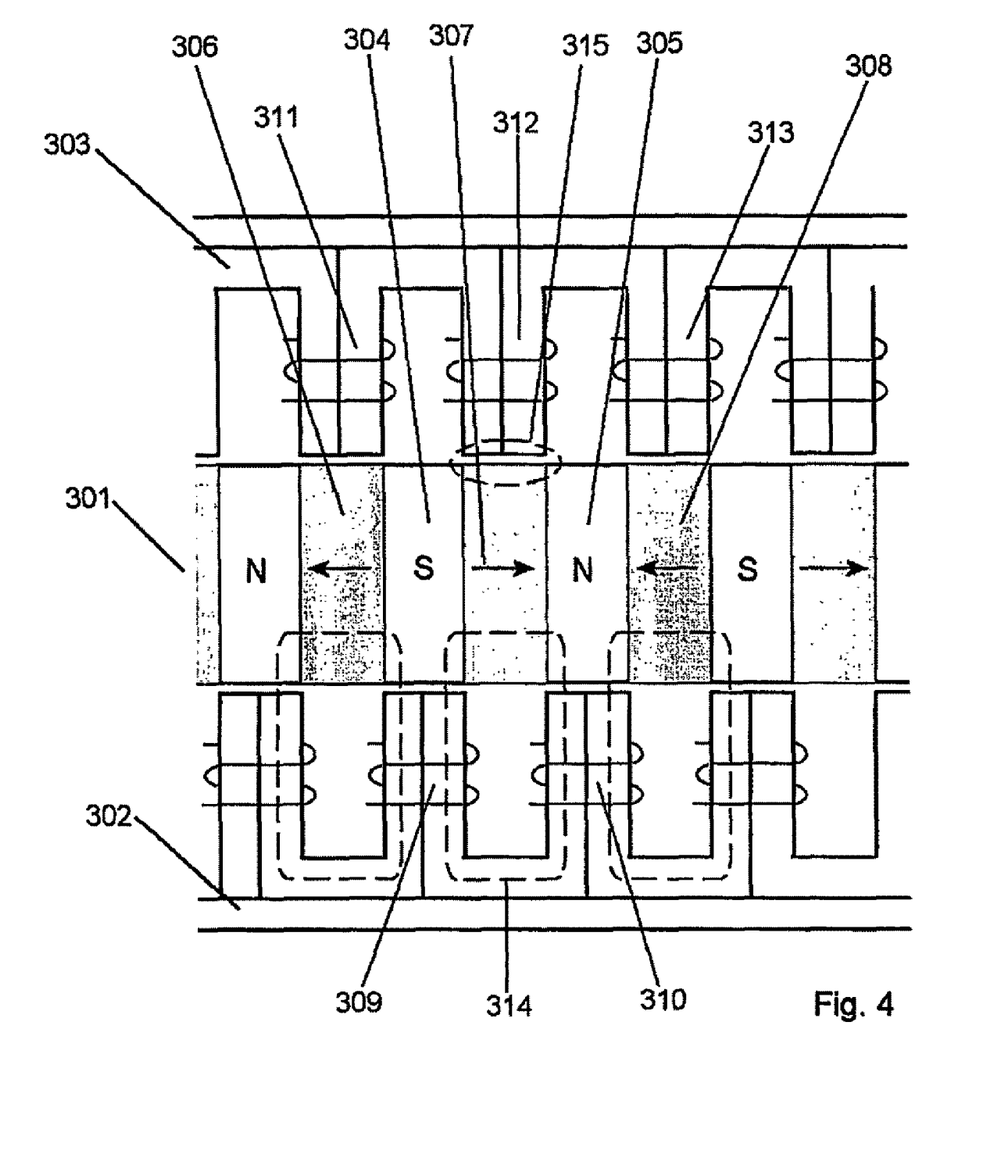
FIG. 4 shows a sectional view of part of the generator of FIG. 3, FIGS. 5a and 5b show a sectional view of a first embodiment of a generator/motor according to the invention having one rotor and one stator.

In FIG. 4 is shown a sectional view of part of the motor/generator of FIG. 3, and the reference numbers are the same as for FIG. 3. FIG. 4 gives a more detailed view of the arrangement of the poles legs 309-313 of the two stators 302, 303 in relation to the pole shoes 304, 305 and the magnets 306, 307, 308 of the rotor 301. It is also seen how the first magnetic flux path 314 includes the pole legs 309, 310, the pole shoe 304, the magnet 307, and the pole shoe 305, while the second magnetic flux path 315 includes the pole leg 312, the pole shoe 304, the magnet 307, and the pole shoe 305. As the pole leg 312 is not facing any of the poles shoes 304 or 305, the magnetic flux density of flux path 315 is much lower than for the flux path 314.

However, according to the present invention, the resulting high, varying axial force of the prior art motor/generators discussed above may be reduced by having a stator with a larger number of pole cores than magnets or pole shoes arranged in the rotor. This is illustrated in the followings figures, in which FIG. 5 shows a sectional view of a first embodiment of a generator/motor according to the invention having one rotor 501 and one stator 502.

Figure 5A:
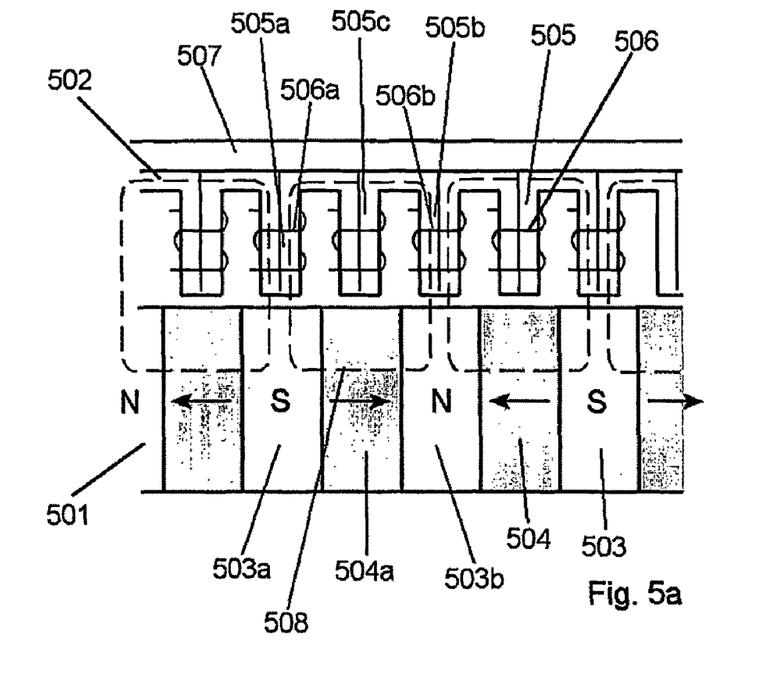
Figure 5B:
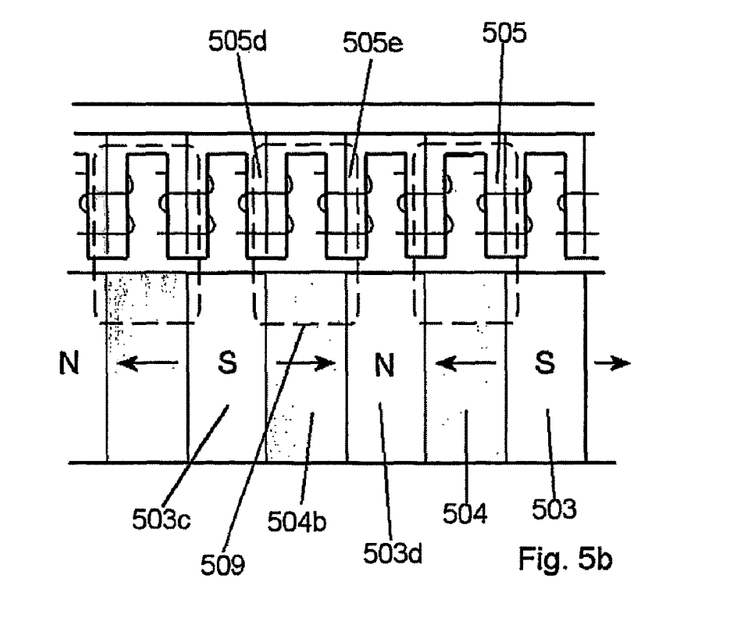

The motor/generator of FIG. 5 corresponds to the design of the motor/generator of FIG. 2 and may have the same outer dimensions. The motor/generator of FIG. 5 has a rotor 501 with pole shoes 503 and a magnet 504 between each two succeeding pole shoes 503. So, the number of magnets 504 is equal to the number of pole shoes 503, which number is set equal to N. The stator 502 comprises a number M of pole cores or pole legs 505, with each pole core or pole leg 505 having a corresponding coil 506, but in contrast to the motor/generator of FIG. 2, M is two times N, whereby the number of pole cores or legs 505 is two times the number of pole shoes 503 or magnets 504 arranged in the rotor 501. The pole cores 505 of the stator are secured to a magnetic termination plate/end shield 507 and the rotor 501 may be secured to a shaft (not shown). It is preferred that the pole shoes 503 and the magnets 504 are magnetically isolated from the shaft. It is also preferred that the magnets 504 are permanent magnets.

In a preferred embodiment, the materials used for motor/generator of FIG. 5 correspond to the materials used for the motor/generator of FIG. 2. However, for the motor/generator of FIG. 5 it is preferred that the width of a pole shoe 503 is substantially equal to the width of a magnet 504, and the width of a stator pole core or leg 505 may be only half the width of a rotor pole shoe 503 or a rotor magnet 504.

In FIG. 5a, the rotor 501 is in a position so that each pole shoe 503 and each magnet are directly facing a pole leg 505. A magnetic flux path 508 is shown, and it is seen that the path 508 includes a first pole leg 505a, a first pole shoe 503a, a magnet 504a, a second pole shoe 503b, and a second pole leg 505b. It is also seen that a third pole leg 505c in between the first and second pole legs 505a,b is not part of the magnetic flux path 508.

When comparing the magnetic flux path 508 of FIG. 5a to the magnetic flux path 18a of FIG. 2, the total area of the two pole legs 505a, 505b facing the rotor 502 is smaller than the total area of the two pole legs 15 in FIG. 2 facing the rotor 10 and being part of the magnetic flux path 18a. Thus, the total magnetic flux in the flux path 508 is smaller than the total magnetic flux running in flux path 18a, with the result that the maximum resulting axial force between the rotor 501 and the stator 502 in FIG. 5a is smaller than the maximum resulting axial force between the rotor 10 and the stator in FIG. 2.

However, when the machine of FIG. 5 is a generator then, due to the lower magnetic flux in the pole legs 505a, 505b, the generated electrical output of the coils 506a, 506b is smaller than the output generated from the coils 16 surrounding the pole legs of the flux path 18a in FIG. 2. This may be compensated for by having a higher number of wirings in the coils 506a, 506b when compared to the wirings of the coils 16 in FIG. 2. As the circumference of a pole leg 505 in FIG. 5 is smaller than the circumference of a pole leg 15 in FIG. 2, then for the same consumption of coil material (such as copper), a larger number of wirings may be achieved for the coils 506 in FIG. 5 than for the coils 16 in FIG. 2.

In FIG. 5b, the rotor 501 has been rotated when compared to FIG. 5a and is in a position so that each pole leg 505 is directly facing a passage between a pole shoe 503 and a magnet 504. A magnetic flux path 509 is shown, and it is seen that it includes a pole leg 505d, a pole shoe 503c, a magnet 504b, another pole shoe 503d, and another pole leg 505e. It is also seen that in this position it is two neighbouring pole legs 505d, 505e, which are now part of the flux path 509. It is furthermore seen that when neglecting the effects of leakage or stray flux, the magnetic flux path 508 uses half of the pole legs 505a and 505b, and the magnetic flux path 509 uses half of the pole legs 505d and 505e. Thus, the total magnetic flux running in the flux path 509 of FIG. 5b is substantially equal to the magnetic flux running in the flux path 508 of FIG. 5a.

In FIG. 5a there are two flux paths running through the pole legs 505a and 505b, but there are no flux paths using the pole leg 505c. Thus, half of the pole legs in FIG. 5a are filled up by two flux paths, while the other half of the pole legs have no flux path. In FIG. 5b a flux path is running through every pole leg, but only half of each pole leg is occupied by a flux path. So, the total magnetic flux between the stator 502 and the rotor 501 in FIG. 5a is substantially equal to the total magnetic flux between the stator 502 and the rotor 501 in FIG. 5b. Thus, the change in the resulting axial force when rotating the rotor 501 of the motor/generator of FIG. 5 will be very small and much smaller than the change in the resulting axial force of the motor/generator of FIG. 2.

Figure 6:
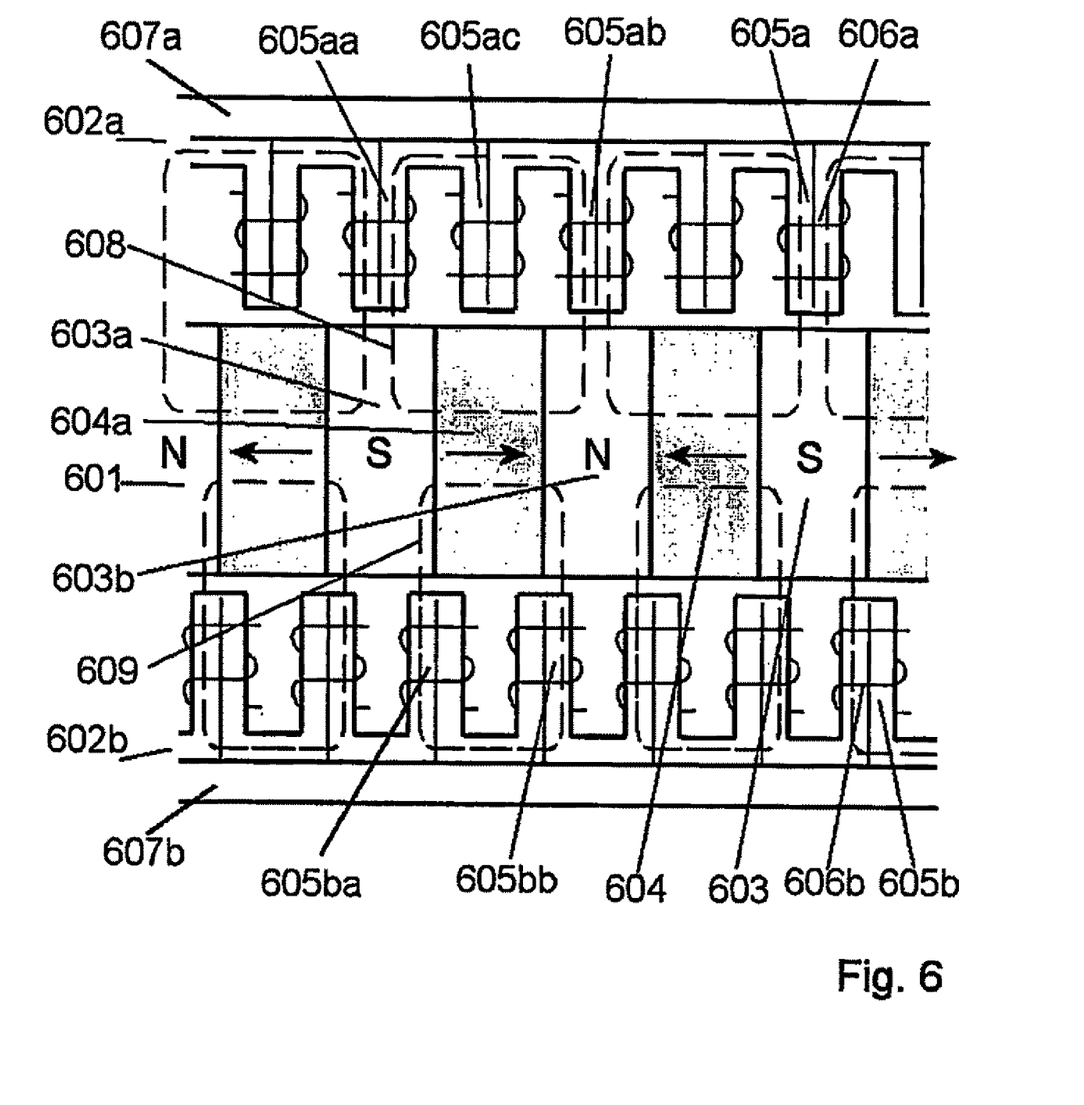
FIG. 6 shows a sectional view of a second embodiment of a generator/motor according to the invention having one rotor and two stators.

FIG. 6 shows a sectional view of a second embodiment of a generator/motor according to the invention having one rotor 601 and two stators 602a, 602b.

The motor/generator of FIG. 6 corresponds to the design of the motor/generator of FIG. 3 and may have the same outer dimensions. The motor/generator of FIG. 6 has a rotor 601 with pole shoes 603 and a magnet 604 between each two succeeding pole shoes 603. So, the number of magnets 604 is equal to the number of pole shoes 603, which number is set equal to N. Both the first stator 602a and the second stator 602b comprises a number M of pole cores or pole legs 605a, 605b, with each pole core or pole leg 605a, 605b having a corresponding coil 606a, 606b, but in contrast to the motor/generator of FIG. 3, M is two times N, whereby the number of pole cores or legs 605a and 605b is two times the number of pole shoes 603 or magnets 604 arranged in the rotor 601. Also here, the pole cores 605a and 605b of the stators 602a and 602b are secured to corresponding magnetic termination plates/end shields 607a, 607b and the rotor 601 may be secured to a shaft (not shown). Again, it is preferred that the pole shoes 603 and the magnets 604 are magnetically isolated from the shaft. It is also preferred that the magnets 604 are permanent magnets.

In a preferred embodiment, the materials used for motor/generator of FIG. 6 correspond to the materials used for the motor/generator of FIG. 3. However, for the motor/generator of FIG. 6 it is preferred that the width of a pole shoe 603 is substantially equal to the width of a magnet 604, and the width of a stator pole core or leg 605 may be only half the width of a rotor pole shoe 603 or a rotor magnet 604.

In FIG. 6, the rotor 601 is in a position so that each pole shoe 603 and each magnet 604 are directly facing a pole leg 605a of the first stator 602a. A magnetic flux path 608 is shown, and it is seen that it includes a first pole leg 605aa, a first pole shoe 603a, a magnet 604a, a second pole shoe 603b, and a second pole leg 605ab. It is also seen that a third pole leg 605ac in between the first and second pole legs is not part of the magnetic flux path 608. For the pole legs 605b of the second stator, each pole leg 605b is directly facing a passage between a pole shoe 503 and a magnet 504. A magnetic flux path 609 is shown, and it is seen that it includes a pole leg 605ba, the first pole shoe 603a, the magnet 604a, a second pole shoe 603b, and another pole leg 605bb.

For the magnetic flux paths 608 and 609, the discussion given above in connection with FIGS. 5a and 5b is valid, leading to the result that for the shown position of the rotor 601 and the stators 602a and 602b, the total magnetic flux between the stator 602a and the rotor 601 is substantially equal to the total magnetic flux between the stator 602b and the rotor 601. So, the resulting axial force between the rotor 601 and the first stator 602a is smaller than the resulting axial force between the rotor 301 and the first stator 302 of FIG. 3, while the resulting axial force between the rotor 601 and the second stator 602b is higher than the resulting axial force between the rotor 301 and the second stator 303 of FIG. 3.

Thus, the change in the resulting axial force when rotating the rotor 601 of the motor/generator of FIG. 6 will be very small and much smaller than the change in the resulting axial force of the motor/generator of FIG. 3.

The discussion for the number of wires of the coils 506 given above in connection with FIG. 5 is also valid for the coils 606a and 606b of FIG. 6.

Figure 7:
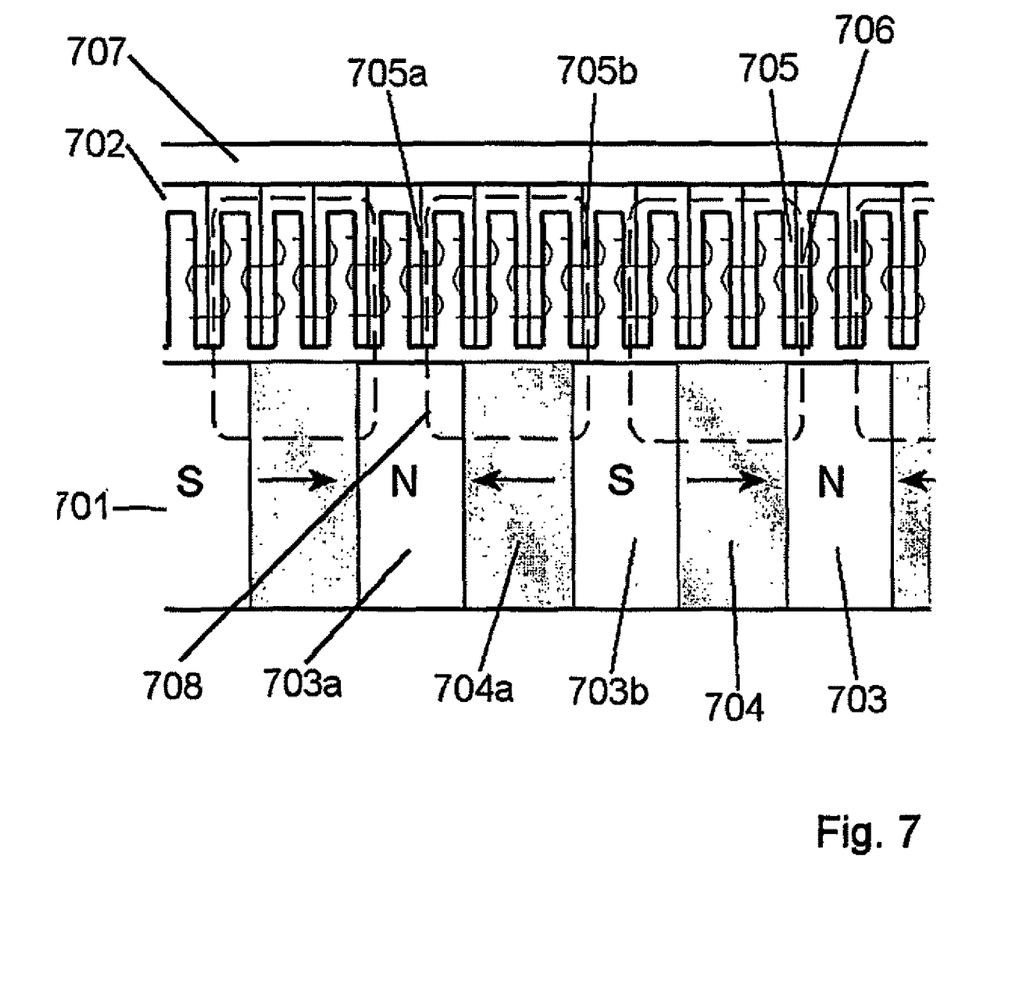
FIG. 7 shows a sectional view of a third embodiment of a generator/motor according to the invention having one rotor and one stator.

It is also within the present invention to provide a generator in which the number M of stator pole cores is four times the number N of the pole shoes. This is illustrated in FIG. 7, which shows a sectional view of a third embodiment according to the invention. The motor/generator of FIG. 7 corresponds to the design of the motor/generator of FIG. 5 and may have the same outer dimensions, but in FIG. 7 M is four times N, whereas in FIG. 5 M is two times N. The motor/generator of FIG. 7 has a rotor 701 with pole shoes 703 and a magnet 704 between each two succeeding pole shoes 703. Also here, the number of magnets 704 is equal to the number of pole shoes 703, which number is set equal to N. The stator 702 comprises the number M of pole cores or pole legs 705, with each pole core or pole leg 705 having a corresponding coil 706. The pole cores 705 of the stator may be secured to a magnetic termination plate/end shield 707 and the rotor 701 may be secured to a shaft (not shown). It is preferred that the pole shoes 703 and the magnets 704 are magnetically isolated from the shaft. It is also preferred that the magnets 704 are permanent magnets.

In a preferred embodiment, the materials used for the motor/generator of FIG. 7 correspond to the materials used for the motor/generator of FIG. 5. Thus, for the motor/generator of FIG. 7 it is preferred that the width of a pole shoe 703 is substantially equal to the width of a magnet 704, and the width of a stator pole core or leg 705 may be only one quarter of the width of a rotor pole shoe 703 or a rotor magnet 704.

In FIG. 7, the rotor 701 is in a position so that each pole shoe 703 and each magnet are directly facing two pole legs 705. A magnetic flux path 708 is shown, and it is seen that the path 708 includes a first pole leg 705a, a first pole shoe 703a, a magnet 704a, a second pole shoe 703b, and a second pole leg 705b. It is also seen that two pole legs in between the first and second pole legs 705a,b are not part of the magnetic flux path 708.

From FIG. 7 it is seen that the flux path 708 fully occupies the pole legs 705a and 705b, while the neighbouring pole legs also facing a pole shoe are occupied by another magnetic flux path. For the remaining half of the pole legs, which are facing a magnet, then to a good approximation, no magnetic flux path is running through these pole legs. When comparing the embodiment of FIG. 7 with the embodiment of FIG. 5a, the total magnetic flux running between the rotor 701, 501 and the stator 702, 502 will be the same for the same dimensions and for the same number N of magnets 704, 504 and pole shoes 703, 503.

When rotating the rotator 701 of FIG. 7 the width of a pole leg 705 in a clockwise direction, then the situation will be the same as shown in FIG. 7, i.e. for each pole shoe 703 two pole legs 705 will bee facing the pole shoe 703, and for each magnet 704 two pole legs 705 will be facing the magnet 704. So, the total pole leg area facing a pole shoe will be the same as illustrated in FIG. 7 with the result that the total magnetic flux running between the stator 702 and the rotor will be substantially the same as in FIG. 7. Thus, the same discussion may be used as given in connection with FIG. 5, and the change in the resulting axial force when rotating the rotor 701 of the motor/generator of FIG. 7 will be very small.

Figure 8:
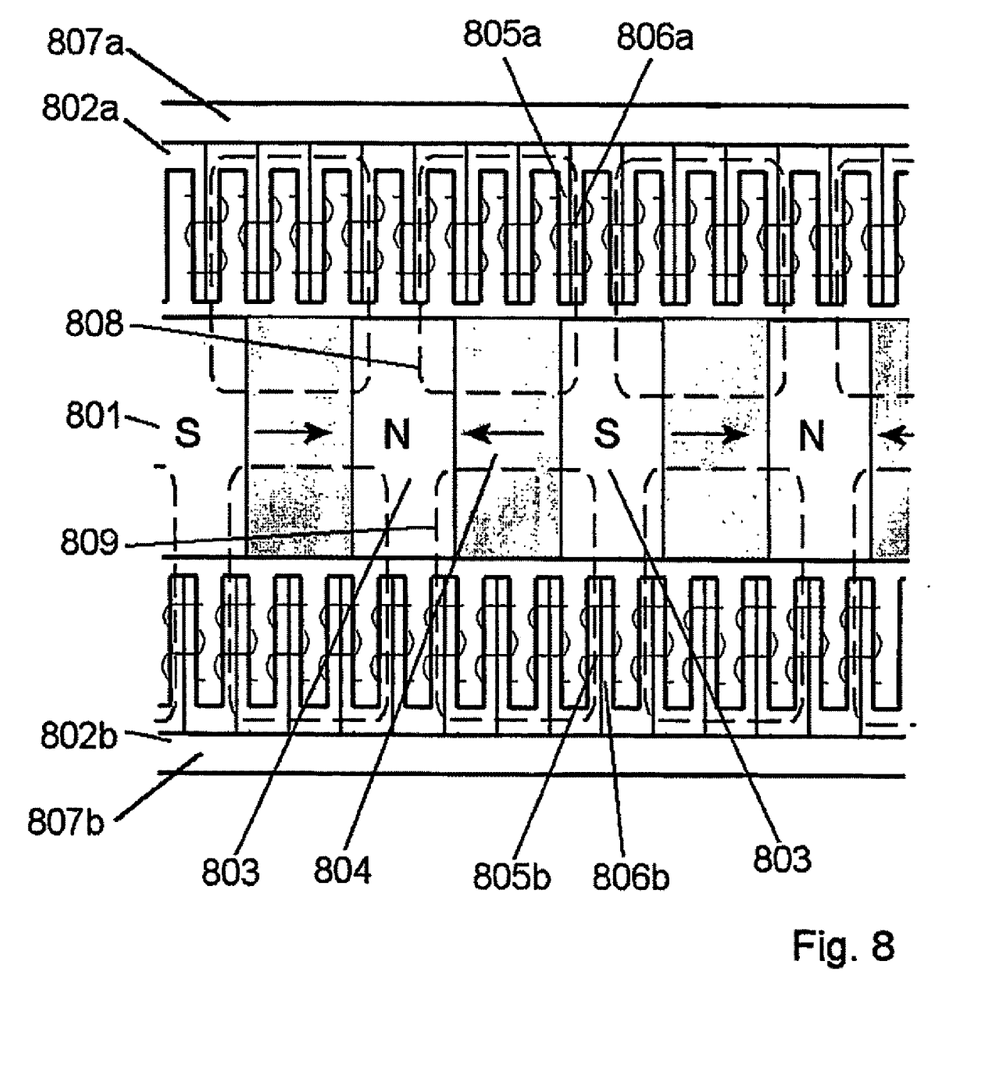
FIG. 8 shows a sectional view of a fourth embodiment of a generator/motor according to the invention having one rotor and two stators.

FIG. 8 shows a sectional view of a fourth embodiment according to the invention having one rotor 801 and two stators 802a and 802b. The motor/generator of FIG. 8 corresponds to the design of the motor/generator of FIG. 6 and may have the same outer dimensions. The motor/generator of FIG. 8 has a rotor 801 with pole shoes 803 and a magnet 804 between each two succeeding pole shoes 803. So, the number of magnets 804 is equal to the number of pole shoes 803, which number is set equal to N. Both the first stator 802a and the second stator 802b comprises a number M of pole cores or pole legs 805a, 805b, with each pole core or pole leg 805a, 805b having a corresponding coil 806a, 806b, but in contrast to the motor/generator of FIG. 6, M is four times N, whereby the number of pole cores or legs 805a and 805b is four times the number of pole shoes 803 or magnets 804 arranged in the rotor 801. Also here, the pole cores 805a and 805b of the stators 802a and 802b may be secured to corresponding magnetic termination plates/end shields 807a, 807b and the rotor 801 may be secured to a shaft (not shown). Again, it is preferred that the pole shoes 803 and the magnets 804 are magnetically isolated from the shaft. It is also preferred that the magnets 804 are permanent magnets.

In a preferred embodiment, the materials used for motor/generator of FIG. 8 correspond to the materials used for the motor/generator of FIG. 6. However, for the motor/generator of FIG. 8 it is preferred that the width of a pole shoe 803 is substantially equal to the width of a magnet 804, and the width of a stator pole core or leg 805 may be only one quarter of the width of a rotor pole shoe 803 or a rotor magnet 804.

In FIG. 8, the rotor 801 is in a position in relation to the stators 802a and 802b similar to the position of the stator 701 and the stator 702 of FIG. 7. So, the rotor 801 is in a position so that each pole shoe 803 and each magnet 804 are directly facing two pole legs 805a and 805b of each stator 802a, 802b. Two magnetic flux paths 808 and 809 are shown, and it is seen that each path 808 and 809 includes two pole legs, two pole shoes, and one magnet. It is also seen that two pole legs, which are arranged in between two pole legs being part of a flux path 808, 809, are not part of a magnetic flux path.

So, in FIG. 8 the total pole leg area facing a pole shoe will be the same for the pole legs 805a of stator 802a as for the pole legs 805b of the stator 802b, with the result that the total magnetic flux running between the stator 802a and the rotor 801 will be substantially the same as for the stator 802b and the rotor 801. Thus, the same discussion may be used as given in connection with FIGS. 5-7, and the change in the resulting axial force when rotating the rotor 801 of the motor/generator of FIG. 8 will be very small.

In should be understood that for electrical machines of the present invention, the stator may in most cases comprise a relatively large number of separate pole cores or pole legs (for example 40 pole cores) and a corresponding number of separate or discrete coils or set of windings.

Such as large number of discrete and galvanic separated coils gives the opportunity of forming a very large number of combinations of voltages and currents.

A few examples:
all coils of one stator may be arranged in series to produce a high voltage;
all coils of one stator may be arranged in parallel to obtain the same voltage as of one coil, but a higher current;
one, two, three or more coils arranged in parallel may be arranged in series with one, two, three or more coils arranged in parallel, all coils being part of the same stator.

While the invention has been particularly shown and described with reference to particular embodiments, it will be understood by those skilled in the art that various changes in form and details may be made therein without departing from the spirit and scope of the invention, and it is intended that such changes come within the scope of the following claims.

The invention claimed is:

1. An axial magnetic flux electrical machine comprising:
 a rotor secured to a shaft with an axis of rotation, said rotor comprising magnets or means for producing a magnetic field and a number set to N of pole shoes; and
 a first stator with air gaps formed between the rotor and the first stator,
 wherein said first stator comprises a number set to M of separate pole cores having corresponding separate coils or a set of windings wound on and surrounding said pole cores, and
 wherein N and M are larger than one and M is larger than N.

2. An axial magnetic flux electrical machine according to claim 1, wherein the rotor magnets or means for producing a magnetic field are arranged between said pole shoes.

3. An axial magnetic flux electrical machine according to claim 1, wherein the rotor magnets or means for producing a magnetic field alternate with the pole shoes.

4. An axial magnetic flux electrical machine according to claim 1, wherein N is an equal number.

5. An axial magnetic flux electrical machine according to claim 1, wherein M is given by A times N, where A is an integral number larger than 1.

6. An axial magnetic flux electrical machine according to claim 5, wherein M is equal to 2N.

7. An axial magnetic flux electrical machine according to claim 5, wherein M is equal to 3N.

8. An axial magnetic flux electrical machine according to claim 5, wherein M is equal to 4N.

9. An axial magnetic flux electrical machine according to claim 1, wherein M is given by N plus 2 times C, M=N+2C, where C is an integral number larger than or equal to 1.

10. An e axial magnetic flux electrical machine according to claim 1, said machine further comprising a second stator with air gaps formed between the rotor and the second stator, said second stator comprising a number set to P of separate pole cores having corresponding separate coils or set of windings wound on and surrounding said pole cores, wherein P is larger than one.

11. An axial magnetic flux electrical machine according to claim 10, wherein P is smaller than or equal to N.

12. An axial magnetic flux electrical machine according to claim 10, wherein P is larger than N.

13. An axial magnetic flux electrical machine according to claim 10, wherein P is given by B times N, where B is an integral number larger than 1.

14. An axial magnetic flux electrical machine according to claim 13, wherein P is equal to 2N.

15. An axial magnetic flux electrical machine according to claim 13, wherein P is equal to 3N.

16. An axial magnetic flux electrical machine according to claim 13, wherein P is equal to 4N.

17. An axial magnetic flux electrical machine according to claim 10, wherein P is equal to M.

18. An axial magnetic flux electrical machine according to claim 10, wherein P is given by N plus 2 times D, P=N+2D, where D is an integral number larger than or equal to 1.

19. An axial magnetic flux electrical machine according to claim 1, wherein at least a portion of one or more of the pole cores of the first and/or a second stator is arranged at an angle to the axis of rotation, said angle being equal to or greater than 0 degrees and below 90 degrees.

20. An axial magnetic flux electrical machine according to claim 1, wherein each separate pole core has a corresponding separate coil or set of windings.

21. An axial magnetic flux electrical machine according to claim 1, wherein the rotor is arranged so that at least part of the rotor is substantially perpendicular to the axis of rotation.

22. An axial magnetic flux electrical machine according to claim 19, wherein the angle between the poles cores and the axis of rotation is equal to or below 45 degrees.

23. An axial magnetic flux electrical machine according to claim 19, wherein the angle between the poles cores and the axis of rotation is equal to or below 30 degrees.

24. An axial magnetic flux electrical machine according to claim 19, wherein at least a portion of one or more of the pole cores is substantially parallel to the axis of rotation.

25. An axial magnetic flux electrical machine according to claim 24, wherein at least a portion of all of the pole cores is substantially parallel to the axis of rotation.

26. An axial magnetic flux electrical machine according to claim 24, wherein one or more windings or coils have their axis substantially parallel to the axis of rotation.

27. An axial magnetic flux electrical machine according to claim 1, wherein the first stator is arranged opposite to and facing a first side of the rotor.

28. An axial magnetic flux electrical machine according to claim 10, wherein the second stator is arranged opposite to and facing a second side of the rotor.

29. An axial magnetic flux electrical machine according to claim 1, wherein the pole cores of the stator provide part(s) of one or more magnetic flux paths.

30. An axial magnetic flux electrical machine according to claim 1, wherein a magnetic flux path includes flux paths through two pole cores.

31. An axial magnetic flux electrical machine according to claim 30, wherein the magnetic flux path further includes two air gaps.

32. An axial magnetic flux electrical machine according to claim 30, wherein a magnetic flux path includes two and only two pole cores.

33. An axial magnetic flux electrical machine according to claim 32, wherein the magnetic flux path further includes two and only two air gaps.

34. An axial magnetic flux electrical machine according to claim 1, wherein the rotor is substantially circular.

35. An axial magnetic flux electrical machine according to claim 1, wherein the first stator further comprises a magnetic conductive end plate connected to the pole cores.

36. An axial magnetic flux electrical machine according to claim 35, wherein the endplate is arranged substantially parallel and opposite to the rotor.

37. An axial magnetic flux electrical machine according to claim 1, wherein the magnets or means for producing a magnetic field are arranged in pairs having poles of similar polarity facing each other.

38. An axial magnetic flux electrical machine according to claim 1, wherein the magnets or means for producing a magnetic field are located radially and equidistantly in the rotor.

39. An axial magnetic flux electrical machine according to claim 27, wherein magnets or means for producing a magnetic field are located on the first side of the rotor facing ends of the pole cores of the first stator.

40. An axial magnetic flux electrical machine according to claim 28, wherein magnets or means for producing a magnetic field are located on the second side of the rotor facing ends of the pole cores of the second stator.

41. An axial magnetic flux electrical machine according to claim 1, wherein the magnets or means for producing a magnetic field are located on the outer periphery of the rotor.

42. An axial magnetic flux electrical machine according to claim 1, wherein the width of a pole core is substantially equal to the distance between two successive pole cores.

43. An axial magnetic flux electrical machine according to claim 1, wherein the width of a pole shoe is substantially equal to two times the distance between two successive pole cores of the first and/or second stator.

44. An axial magnetic flux electrical machine according to claim 1, wherein the machine is a synchronous one phase machine.

45. An axial magnetic flux electrical machine according to claim 1, wherein the magnets are permanent magnets.

46. An axial magnetic flux electrical machine according to claim 1, wherein the means for producing a magnetic field are electromagnets.

47. An axial magnetic flux electrical machine according to claim 1, wherein a winding or coil is formed by a flat concentrated coil.

48. An axial magnetic flux electrical machine according to claim 1, wherein the pole cores are assembled of a magnetic conducting material.

49. An axial magnetic flux electrical machine according to claim 48, wherein the magnetic conducting material is a field oriented soft magnetic lamination.

50. An axial magnetic flux electrical machine according to claim 1, wherein the machine is a generator, which may be provided with a mechanical force/power via said shaft to generate an electrical power via said windings.

51. An axial magnetic flux electrical machine according to claim 1, wherein the machine is a motor, which may be provided with power from an electrical source via said windings to generate a mechanical force/power via said shaft.

52. An axial magnetic flux electrical machine according to claim 50, wherein said machine is disposed in conjunction with a wind turbine.

53. A method of obtaining a number of phases in a multiphase machine, the method comprising arranging a number of one phase axial magnetic flux electrical machines according to claim 44 in series.

54. An axial magnetic flux electrical machine according to claim 1, wherein the pole legs or pole cores are formed by U-shaped elements, said elements being arranged in the stator so that one pole leg is formed by two adjacent legs of two U-shaped elements.

55. An axial magnetic flux electrical machine according to claim 54, wherein the pole legs or pole cores are made of a magnetic conducting material, and wherein the pole legs are arranged on a stator plate made of a material having a low magnetic conductivity.

* * * * *